US010810861B2

(12) United States Patent
Kim et al.

(10) Patent No.: US 10,810,861 B2
(45) Date of Patent: Oct. 20, 2020

(54) REAL-TIME ACCELERATION SENSOR CALIBRATION APPARATUS FOR MEASURING MOVEMENT OF VEHICLE AND ACCELERATION SENSOR CALIBRATION METHOD USING THE SAME

(71) Applicant: SUNTECH INTERNATIONAL LTD., Seoul (KR)

(72) Inventors: Jung Hun Kim, Seoul (KR); Sun A Kim, Ansan-si (KR); Dae Sung Lee, Namyangju-si (KR); Jai Chang Yang, Seoul (KR)

(73) Assignee: SUNTECH INTERNATIONAL LTD., Seoul (KR)

( * ) Notice: Subject to any disclaimer, the term of this patent is extended or adjusted under 35 U.S.C. 154(b) by 326 days.

(21) Appl. No.: 15/948,063

(22) Filed: Apr. 9, 2018

(65) Prior Publication Data

US 2019/0279493 A1 Sep. 12, 2019

Related U.S. Application Data

(63) Continuation of application No. PCT/KR2018/002604, filed on Mar. 6, 2018.

(51) Int. Cl.

| | |
|---|---|
| ***G08B 25/10*** | (2006.01) |
| ***G06Q 40/08*** | (2012.01) |
| ***G01C 25/00*** | (2006.01) |
| ***G01P 21/00*** | (2006.01) |
| ***G01P 15/18*** | (2013.01) |

(52) U.S. Cl.
CPC ........... *G08B 25/10* (2013.01); *G01C 25/005* (2013.01); *G01P 21/00* (2013.01); *G06Q 40/08* (2013.01)

(58) Field of Classification Search
CPC ...... G08B 25/10; G06Q 40/08; G01C 25/005; G01P 21/00; G01P 15/18
See application file for complete search history.

(56) References Cited

U.S. PATENT DOCUMENTS

2012/0203487 A1* 8/2012 Johnson .............. G01C 25/005 702/104
2016/0047675 A1* 2/2016 Tanenhaus ........... G01C 25/005 702/104

FOREIGN PATENT DOCUMENTS

KR 101095156 B1 12/2011

* cited by examiner

*Primary Examiner* — Basil T. Jos
(74) *Attorney, Agent, or Firm* — Dinsmore & Shohl LLP; Yongsok Choi, Esq.

(57) ABSTRACT

Provided are a real-time acceleration sensor calibration apparatus for measuring a movement of a vehicle and an acceleration sensor calibration method, the acceleration sensor calibration apparatus including an acceleration sensor configured to measure a triaxial acceleration value, a gyroscope configured to measure a triaxial angular velocity value, an acceleration data calibrator configured to primarily transform a vector of the measured acceleration value using a gravity vector calculated based on the triaxial acceleration value and the triaxial angular velocity value measured by the acceleration sensor and the gyroscope, and a communicator configured to transmit information related to the movement of the vehicle to a server based on calibrated acceleration data.

14 Claims, 11 Drawing Sheets

REAL-TIME ACCELERATION SENSOR CALIBRATION APPARATUS FOR MEASURING MOVEMENT OF VEHICLE AND ACCELERATION SENSOR CALIBRATION METHOD USING THE SAME

CROSS-REFERENCE TO RELATED APPLICATIONS

This application is a continuation of International Application No. PCT/KR2018/002604 filed on Mar. 6, 2018, the entire contents of which are incorporated herein by reference.

TECHNICAL FIELD

Embodiments relate to a real-time acceleration sensor calibration apparatus for measuring a movement of a vehicle and an acceleration sensor calibration method using the same, and more particularly, to a telematics apparatus for measuring and storing a movement of a vehicle in real time using an acceleration sensor and a gyroscope, and transmitting the movement of the vehicle to a server and an acceleration sensor calibration method using the same.

BACKGROUND ART

Vehicles are the necessities for modern people. With an increasing population owning vehicles, the importance of information such as a driving behavior of a driver who drives a vehicle has been increased. For example, industries related to usage-based insurance (UBI) that measures vehicle insurance costs based on driving behaviors such as speeding, harsh acceleration, and harsh braking are gradually growing.

Such information is acquired and constructed as big data using telematics technology. Telematics is a combination of telecommunication and informatics. All wireless data services for exchanging information using technology for wireless communication with a computer mounted in transportation equipment such as a vehicle, an aircraft or a vessel, a global navigation satellite system, or technology for changing a character signal and a voice signal on the Internet are collectively referred to as telematics.

However, the recently developed telematics technology focuses on transmitting signals, for example, rescue signals when a crash occurs while driving. Korean Patent Publication No. 10-1095156 discloses "Method for Providing Emergency Safety Service Using Telematics System".

SUMMARY

An aspect provides technology that collects information related to a movement of a vehicle in real time to measure the movement of the vehicle, transmits the collected information to a server, and constructs a driving behavior database of a driver.

Another aspect provides an apparatus and method for calibrating a measurement error of an acceleration sensor in real time to collect accurate data.

Still another aspect provides technology that collects information related to a movement of a vehicle generated when the vehicle crashes, and provides data related to events occurring before and after the crash.

Yet another aspect provides technology that reconstructs a vehicle accident based on data generated before and after a crash.

Further another aspect provides technology that provides data to be used for industries related to usage-based insurance (UBI) by verifying a state of a vehicle, whether the vehicle is inspected, and a driving behavior such as speeding, harsh acceleration, harsh braking, driving frequency/count, cornering, or road shapes.

The technical tasks obtainable from the present disclosure are non-limited by the above-mentioned technical tasks. And, other unmentioned technical tasks can be clearly understood from the following description by those having ordinary skill.

According to an aspect, there is provided a real-time acceleration sensor calibration apparatus for measuring a movement of a vehicle, the acceleration sensor calibration apparatus including an acceleration sensor configured to measure a triaxial acceleration value, a gyroscope configured to measure a triaxial angular velocity value, an acceleration data calibrator configured to primarily transform a vector of the measured acceleration value using a gravity vector calculated based on the triaxial acceleration value and the triaxial angular velocity value measured by the acceleration sensor and the gyroscope, and a communicator configured to transmit information related to the movement of the vehicle to a server based on calibrated acceleration data.

The acceleration data calibrator may be configured to perform a secondary transformation with respect to a horizontal plane travel direction axis when a magnitude of a horizontal plane vector of the primarily transformed vector exceeds a predetermined value.

The gravity vector may be calculated using a quaternion value calculated based on the triaxial acceleration value and the triaxial angular velocity value.

The secondary transformation may be performed when the triaxial angular velocity value is (0, 0, 0).

The acceleration data calibrator may be configured to determine angles a and b for the primary transformation and an angle c for the secondary transformation, and transform the vector of the triaxial acceleration value measured by the acceleration sensor using the angles a, b and c.

The angles a and b may be derived in real time by the acceleration data calibrator each time the vector of the triaxial acceleration value is measured by the acceleration sensor.

The acceleration data calibrator may be configured to calculate the angle c based on a value of the horizontal plane vector of the primarily transformed vector, if a value of the angle c is yet to be calculated.

The acceleration sensor calibration apparatus may further include a global positioning system (GPS) receiver configured to detect a position of the vehicle, and the acceleration sensor calibration apparatus may be configured to recognize a crash of the vehicle when a magnitude of a horizontal plane vector of the primarily transformed vector exceeds a predetermined value, and transmit data related to the position, a velocity and an acceleration of the vehicle through the communicator to the server in response to the recognition of the crash of the vehicle.

According to another aspect, there is also provided an acceleration sensor calibration method using a real-time acceleration sensor calibration apparatus for measuring a movement of a vehicle, the acceleration sensor calibration method including measuring a triaxial acceleration value and a triaxial angular velocity value using an acceleration sensor and a gyroscope, calculating a gravity vector based on the measured triaxial acceleration value and the measured triaxial angular velocity value, primarily transforming a vector of the measured acceleration value using the calculated gravity vector, and transmitting information related to the movement of the vehicle to a server based on calibrated acceleration data.

The acceleration sensor calibration method may further include, after the primarily transforming of the vector of the acceleration value, performing a secondary transformation with respect to a horizontal plane travel direction axis when a magnitude of a horizontal plane vector of the primarily transformed vector exceeds a predetermined value.

The gravity vector may be calculated using a quaternion value calculated based on the triaxial acceleration value and the triaxial angular velocity value.

The secondary transformation may be performed when the triaxial angular velocity value is (0, 0, 0).

Angles a and b for the primary transformation and an angle c for the secondary transformation may be determined, and the vector of the triaxial acceleration value measured by the acceleration sensor may be transformed using the angles a, b and c.

The angles a and b may be derived in real time by an acceleration data calibrator each time the vector of the triaxial acceleration value is measured by the acceleration sensor.

The angle c may be calculated based on a value of the horizontal plane vector of the primarily transformed vector, if a value of the angle c is yet to be calculated.

The acceleration sensor calibration method may further include recognizing a crash of the vehicle when a magnitude of a horizontal plane vector of the primarily transformed vector exceeds a predetermined value, and transmitting, to the server, data related to the position, a velocity and an acceleration of the vehicle measured by a GPS receiver in response to the recognition of the crash of the vehicle.

According to an embodiment, an acceleration sensor calibration apparatus and a method using the same may collect information related to a movement of a vehicle in real time to measure the movement of the vehicle, transmit the collected information to a server, and construct a driving behavior database of a driver.

According to an embodiment, an acceleration sensor calibration apparatus and a method using the same may calibrate a measurement error of an acceleration sensor in real time to collect accurate data.

According to an embodiment, an acceleration sensor calibration apparatus and a method may collect information related to a movement of a vehicle generated when the vehicle crashes, and provide data related to events occurring before and after the crash.

According to an embodiment, an acceleration sensor calibration apparatus and a method may reconstruct a vehicle accident based on data generated before and after a crash.

According to an embodiment, an acceleration sensor calibration apparatus and a method may provide data to be used for industries related to usage-based insurance (UBI) by verifying a state of a vehicle, whether the vehicle is inspected, and a driving behavior such as speeding, harsh acceleration, harsh braking, tailgating, driving frequency/count, cornering, or road shapes.

The effects obtainable from the present disclosure are non-limited by the above-mentioned effects. And, other unmentioned effects can be clearly understood from the following description by those having ordinary skill.

DETAILED DESCRIPTION

Hereinafter, embodiments will be described in detail with reference to the accompanying drawings, such that those having ordinary skill in the art to which the present disclosure pertains may easily practice the present disclosure. The present disclosure may, however, be embodied in many different forms and should not be construed as being limited to the embodiments set forth herein.

The terminology used herein is for the purpose of describing particular embodiments only and is not intended to be limiting. As used herein, the singular forms "a," "an," and "the," are intended to include the plural forms as well, unless the context clearly indicates otherwise.

It will further be understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). Also, in the description of embodiments, detailed description of well-known related structures or functions will be omitted when it is deemed that such description will cause ambiguous interpretation of the present disclosure.

Furthermore, elements included in embodiments of the present disclosure are independently illustrated to describe different specific functions, and each of the elements may not indicate separate hardware or one software element. That is, the respective elements are arranged and included for convenience of description. Among the elements, two or more elements may be combined to serve as one element, and one element may be divided into a plurality of elements to perform a function. The integrated embodiment of the elements and the divided embodiments of each element are included in the claims as long as they do not depart from the spirit of the present disclosure.

Hereinafter, embodiments will be described in detail with reference to the accompanying drawings. The configuration and effects thereof can be clearly understood from the following description.

Figure 1:
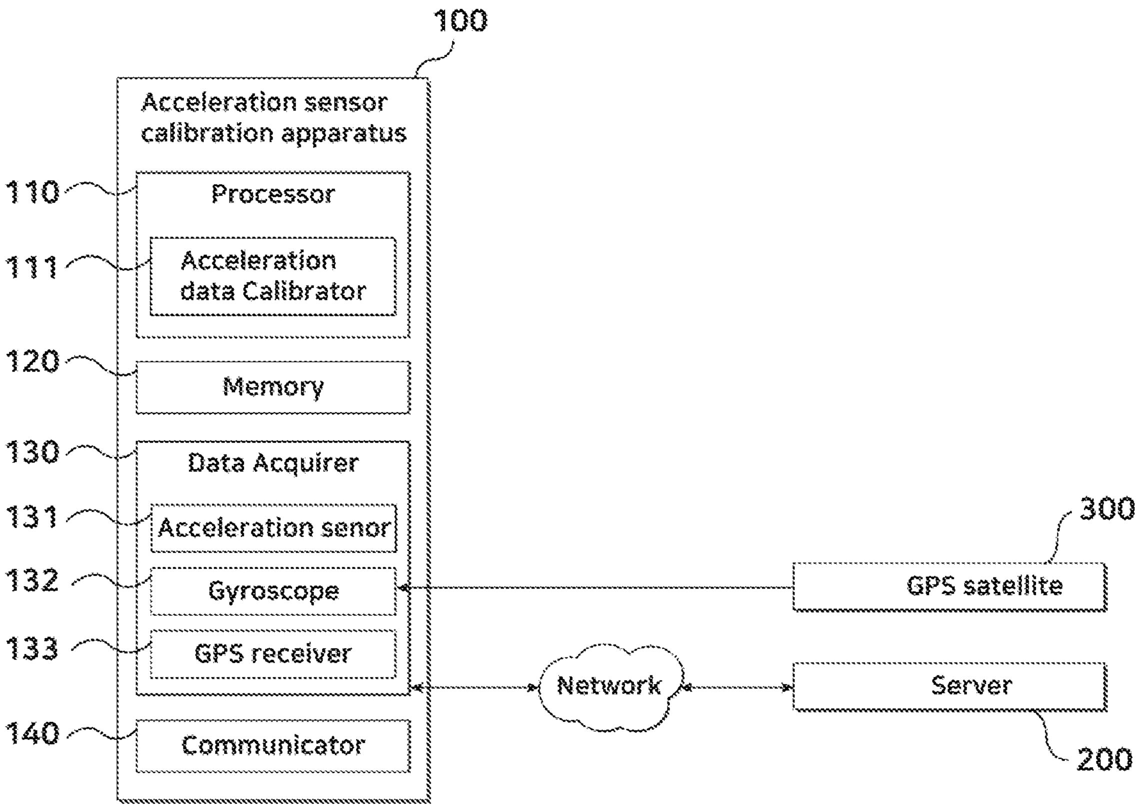
FIG. 1 is a block diagram illustrating a configuration of an acceleration sensor calibration apparatus according to an embodiment.

FIG. 1 is a block diagram illustrating a configuration of an acceleration sensor calibration apparatus according to an embodiment.

Referring to FIG. 1, a real-time acceleration sensor calibration apparatus 100 for measuring a movement of a vehicle may include a processor 110, a memory 120, a data acquirer 130, and a communicator 140.

The processor 110 may perform various control and processing operations of the acceleration sensor calibration apparatus 100, and execute data processing or operations related to control and communication of a plurality of elements. For example, the processor 110 may be a central processing unit (CPU), and the CPU may include an application processor (AP). The processor 110 may include an internal memory that stores data or instructions related to one or more other elements, or may access required information by communicating with an external memory as necessary.

The processor 110 may include an acceleration data calibrator 111. The acceleration data calibrator 111 may calculate a gravity vector based on a triaxial acceleration value and a triaxial angular velocity value measured by an acceleration sensor 131 and a gyroscope 132 of the data acquirer 130, which will be described later. Further, the acceleration data calibrator 111 may primarily transform a vector of the measured acceleration value using the calculated gravity vector.

The memory 120 may be a data storage and include a volatile or non-volatile memory, and store the data or instructions related to one or more other elements. In an example, the processor 110 may store data processed or acquired by the data acquirer 130, and the communicator 140 may read the data stored in the memory 120 and transmit the data to an outside.

The data acquirer 130 may include the acceleration sensor 131 that measures the triaxial acceleration value, the gyroscope 132 that measures the triaxial angular velocity value, and a global positioning system (GPS) receiver 133 that acquires a position value by receiving a GPS signal from a GPS satellite 300.

The acceleration sensor 131 may measure an acceleration, and may include a triaxial accelerometer that measures accelerations of x-axial, y-axial, and z-axial directions. Basically, the acceleration sensor 131 may sense only a gravitational acceleration when the vehicle is stationary.

Further, the acceleration sensor 131 may read the triaxial acceleration value at predetermined intervals, set a low-pass filter, and adjust and set a sampling rate based on a polling time. The data of the acceleration sensor 131 may include noise when used as is, and thus the noise may be reduced using a mean value, the low-pass filter, or a Kalman filter.

The gyroscope 132 may be a gyro sensor and measure an angular velocity of the vehicle, and operate as a triaxial angular velocity sensor that measures angular velocities of x-axial, y-axial, and z-axial directions.

Further, the gyroscope 132 may read the triaxial angular velocity value at predetermined intervals, set a low-pass filter, and adjust and set a sampling rate based on a polling time. The data of the gyroscope 132 may include noise when used as is, and thus the noise may be reduced using a mean value, the low-pass filter, or a Kalman filter.

The GPS receiver 133 may be a device that receives a GPS signal from a satellite. The GPS receiver 133 may detect a current position of the receiver by receiving the signal from the satellite, and calculate a position or a velocity of the vehicle based on the detected current position of the receiver.

The GPS receiver 133 may acquire position data in real time, and the processor 110 may receive and process the position data acquired through the GPS receiver 133 every second.

The communicator 140 may transmit the information related to the movement of the vehicle to a server 200 based on calibrated acceleration data. The information related to the movement of the vehicle may be data stored in the memory 120, and include, for example, an instruction type, a device unique ID, a protocol version, a current time (year, month, day, hour, minute, second), a current position (latitude, longitude), a current velocity (speed, direction) of the vehicle, an acceleration sensor value, or a gyroscope value. To achieve the foregoing, the communicator 140 may be connected to an external network to communicate with the server 200, and the external network and the communicator 140 may be connected through wireless communication.

The wireless communication may include, for example, cellular communication or short-range communication. For example, the cellular communication may include at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM). The short-range communication may include at least one of wireless fidelity (Wi-Fi), Bluetooth, and near field communication (NFC). However, embodiments are not limited thereto. The wireless communication should be construed as including other wireless communication technologies to be developed in the future.

Figure 2A:
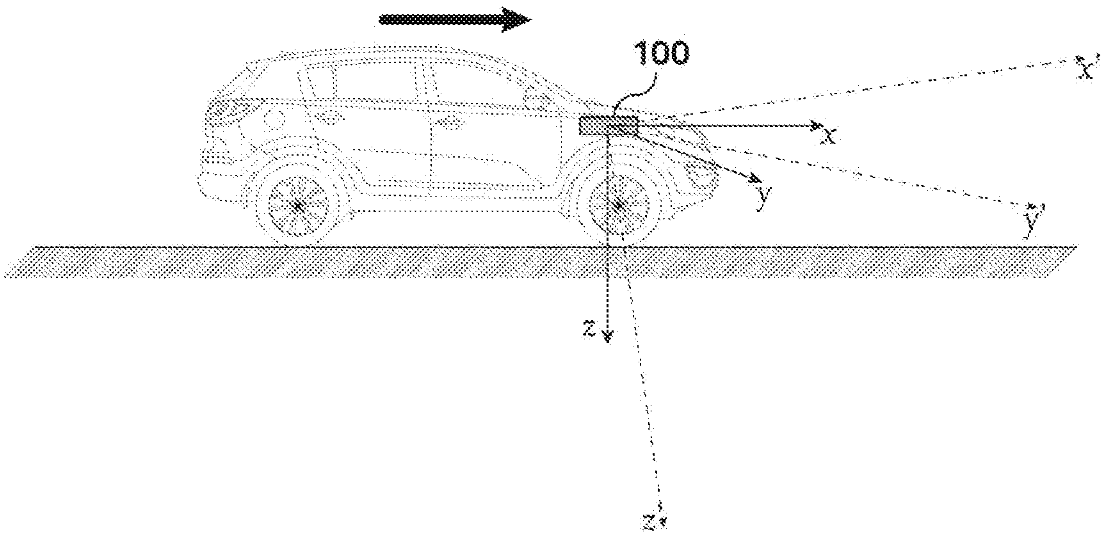
FIG. 2A illustrates an example of an acceleration sensor with twisted axes according to an embodiment.
Figure 2B:
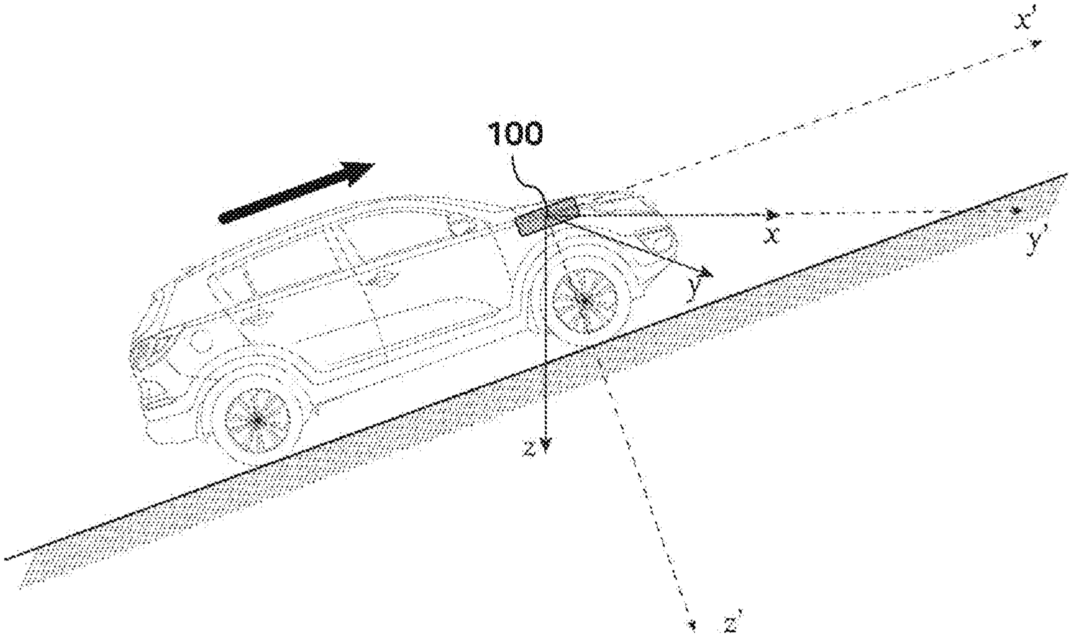
FIG. 2B illustrates an example of an acceleration sensor with twisted axes on an uphill road according to an embodiment.
Figure 2C:
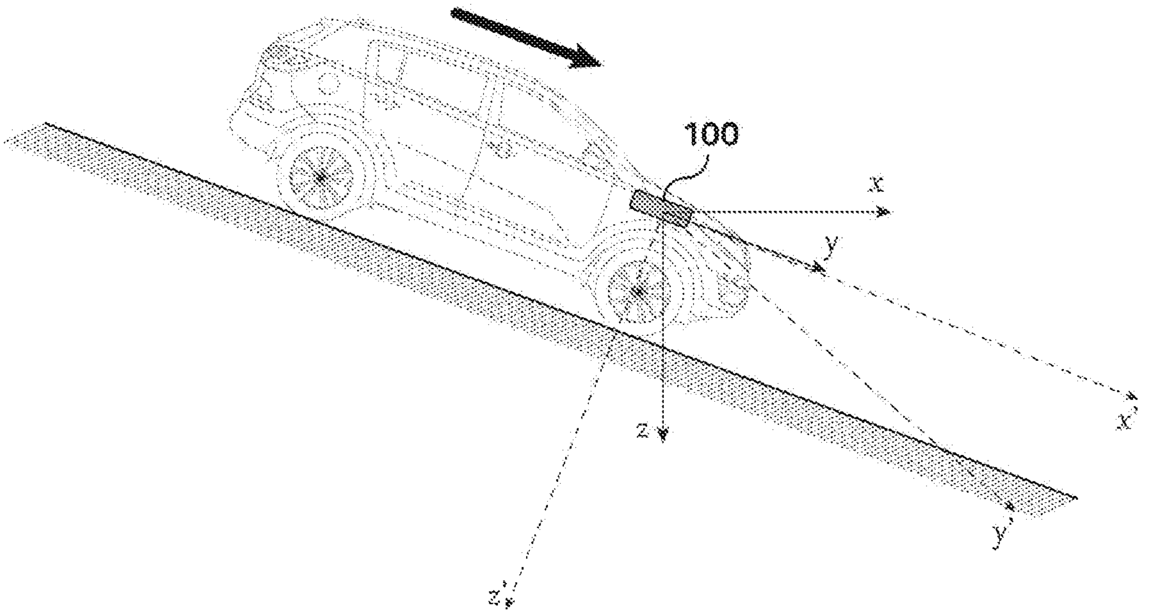
FIG. 2C illustrates an example of an acceleration sensor with twisted axes on a downhill road according to an embodiment.

FIG. 2A illustrates an example of an acceleration sensor with twisted axes according to an embodiment, FIG. 2B illustrates an example of the acceleration sensor with the twisted axes on an uphill road according to an embodiment, and FIG. 2C illustrates an example of the acceleration sensor with the twisted axes on a downhill road according to an embodiment.

Describing in detail with reference to FIG. 2A, a triaxial reference coordinate system may define an actual travel direction of a vehicle as an axis x, a direction at an angle of 90 degrees to the travel direction as an axis y, and a direction of gravity as an axis z. However, a coordinate system (x', y', z') may be twisted when compared to the reference coordinate system (x, y, z).

This phenomenon may occur since the real-time acceleration sensor calibration apparatus 100 for measuring a movement of a vehicle may be mounted on the vehicle in an inappropriate direction. Further, the coordinate system may be twisted as the vehicle moves or by an external impact. Due to such various factors, distorted data may be actually measured by the acceleration sensor calibration apparatus 100.

In this example, calibration with respect to an acceleration value measured in a horizontal direction may be needed. That is, in a case in which the vehicle is stationary or travels at a constant speed, the calibration may be performed such that only a gravitational acceleration value of 1 g may be recognized. For example, when the calibration is performed in a case in which a reference value measured by a sensor with respect to 1 G is "256", an acceleration value measured in a state in which the vehicle is stationary may become an approximate value of (0, 0, 256).

In addition, referring to FIGS. 2B and 2C, in a case in which the vehicle enters an uphill road or a downhill load, the acceleration value calibrated on the level ground may need to be additionally calibrated in real time due to a change in geographical features. Here, the coordinate system (x', y', z') may be the coordinate system calibrated on the level ground, and the coordinate system (x, y, z) may be the coordinate system additionally calibrated in real time.

Figure 3:
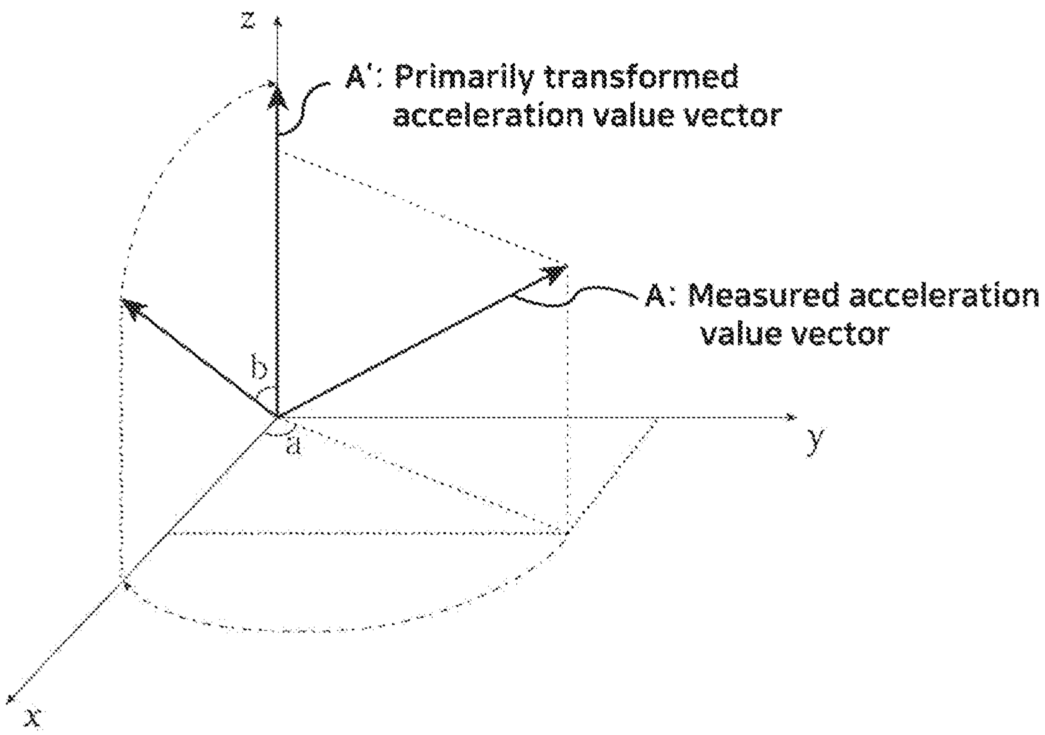
FIG. 3 illustrates an example of primarily transforming a vector of an acceleration value according to an embodiment.

FIG. 3 illustrates an example of primarily transforming a vector of an acceleration value according to an embodiment.

Calibration of an acceleration value may be performed in three operations. In the first operation, the acceleration data calibrator 111 may calculate a quaternion by taking the data of the acceleration sensor 131 and the gyroscope 132 at predetermined sampling intervals, and calculate a gravity vector using the quaternion.

If a value of the quaternion is $$q_0+q_1^i+q_2^j+q_3^k,$$

the gravity vector may be expressed as follows.

$$g(x)=2(q_1q_3-q_0q_2)$$

$$g(y)=2(q_0q_1+q_2q_3)$$

$$g(z)=q_0^2-q_1^2-q_2^2+q_3^2$$

Describing the second operation with reference to FIG. 3, the acceleration data calibrator 111 may primarily transform a measured acceleration value vector A using the gravity vector obtained in the first operation. Here, the primary transformation refers to calculation of a rotation angle a of the axis x and a rotation angle b of the axis y. The rotation angles a and b may be calculated using the following equations.

$$a=\tan^{-1}\left(\frac{g(y)}{g(z)}\right)$$

$$b=\tan^{-1}\left(\frac{g(x)}{\sqrt{g(y)^2+g(z)^2}}\right)\times(-1)$$

The measured acceleration value vector A may be calibrated to A' through the primary transformation and calibration. As described above, through the vector transformation in the first and second operations, the z-axial direction of the acceleration sensor 131 may be matched to the actual direction of the gravity vector. The acceleration data calibrator 111 may calculate the primarily transformed angles a and b, and store the values of a and b in the memory 120.

Meanwhile, the acceleration value may need to be calibrated continuously or in real time based on geographical features as shown in FIGS. 2B and 2C. Thus, the acceleration sensor calibration apparatus 100 of FIG. 2 may measure the acceleration in real time, calculate a and b each time the acceleration is measured, and calibrate the measured acceleration value. In the third operation, which will be described later, a task of matching the travel direction of the vehicle to the x-axial direction of the acceleration sensor 131 may be performed additionally.

Figure 4A:
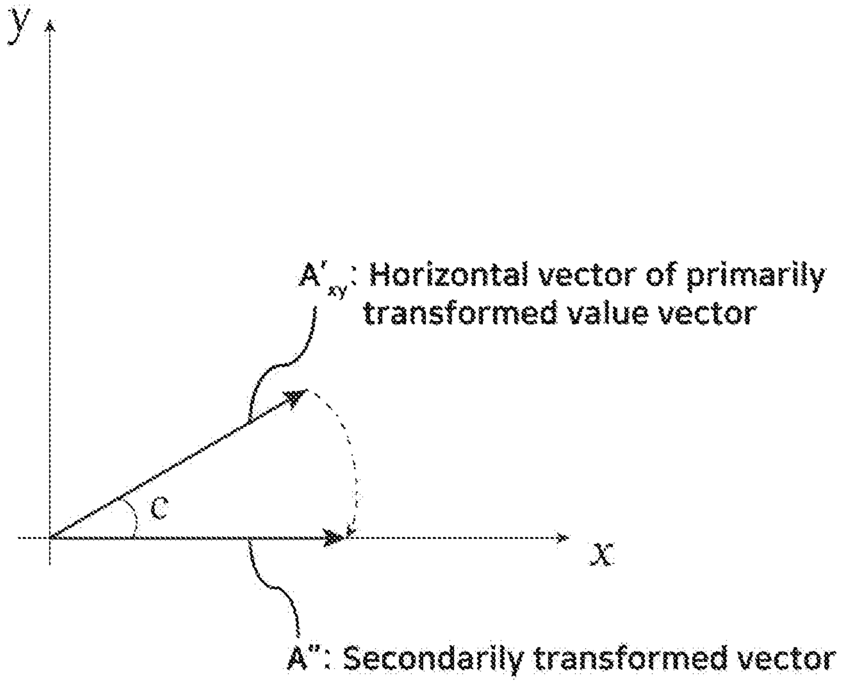
FIG. 4A illustrates an example of secondary transformation on a horizontal plane when a vehicle speeds up according to an embodiment.

FIG. 4A illustrates an example of secondary transformation on a horizontal plane when a vehicle speeds up according to an embodiment. An acceleration of the vehicle may occur in a case in which the vehicle speeds up or in a case in which the vehicle slows down. The former case will be described first.

The third operation of transforming the measured acceleration value vector is transformation to match the travel direction of the vehicle to the acceleration axis x. The acceleration data calibrator 111 may perform the second transformation with respect to a horizontal plane travel direction axis when a magnitude of a horizontal plane vector of the primarily transformed vector exceeds a predetermined value.

That is, when the acceleration value vector A' transformed in the second operation is $(x_1, y_1, z_1)$, when a magnitude of a two-dimensional $(x_1, y_1)$ vector of a horizontal plane from which a gravitational acceleration value is removed exceeds the predetermined value and in this example a value of the data read by the gyroscope 132 is (0, 0, 0), the second transformation may be performed to derive an angle c.

In detail, when the vehicle speeds up, a horizontal vector $A'_{xy}$ of the primarily transformed acceleration value vector may have a component of the travel direction of the vehicle, for example, the axis x. However, a direction of the horizontal vector $A'_{xy}$ of the primarily transformed acceleration value vector may not exactly match the travel direction of the vehicle. Thus, calibration may be needed to match the direction of the axis x set as the travel direction to the travel direction of the vehicle.

However, when the vehicle is making a turn, the horizontal vector $A'_{xy}$ of the primarily transformed acceleration value vector may be also highly likely to include distorted information. Thus, the second transformation may be performed only when the vehicle is not making a turn. Whether the vehicle is making a turn may be verified based on the triaxial angular velocity value obtained by the gyroscope 132. When the vehicle is making a turn, the triaxial angular velocity value may have values with respect to x, y, and z. When the vehicle is not making a turn, the triaxial angular velocity may be (0, 0, 0) since no value is measured. As described above, when the vehicle is not making a turn and thus the angular velocity is "0", the angle c may be obtained.

Figure 4B:
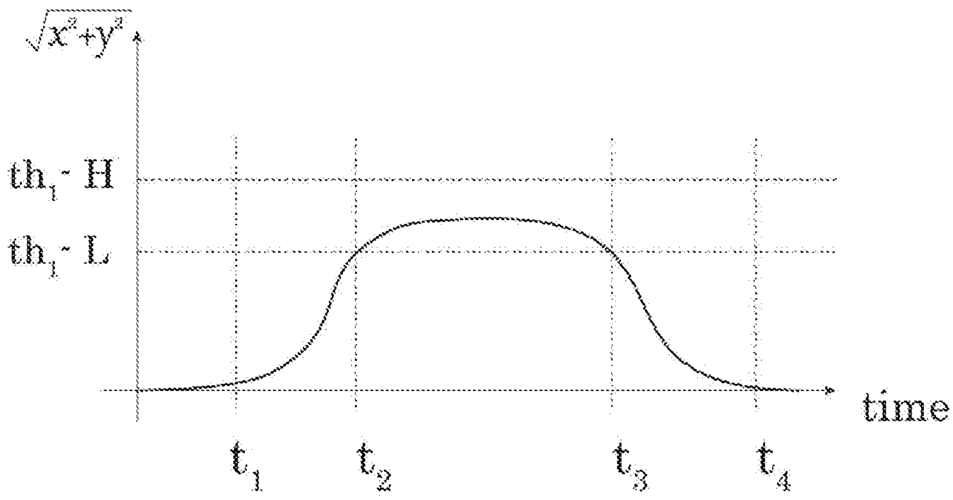
FIG. 4B is a graph illustrating a magnitude of an acceleration on a horizontal plane over time when a vehicle speeds up according to an embodiment.

FIG. 4B is a graph illustrating a magnitude of an acceleration on a horizontal plane over time when a vehicle speeds up according to an embodiment. Referring to FIG. 4B, when the vehicle speeds up, a change in a magnitude of x, y vector may form a curve having a gentle slope, in general. To analyze this pattern, the angle c may be obtained by predetermining a set value with respect to acceleration.

Figure 5A:
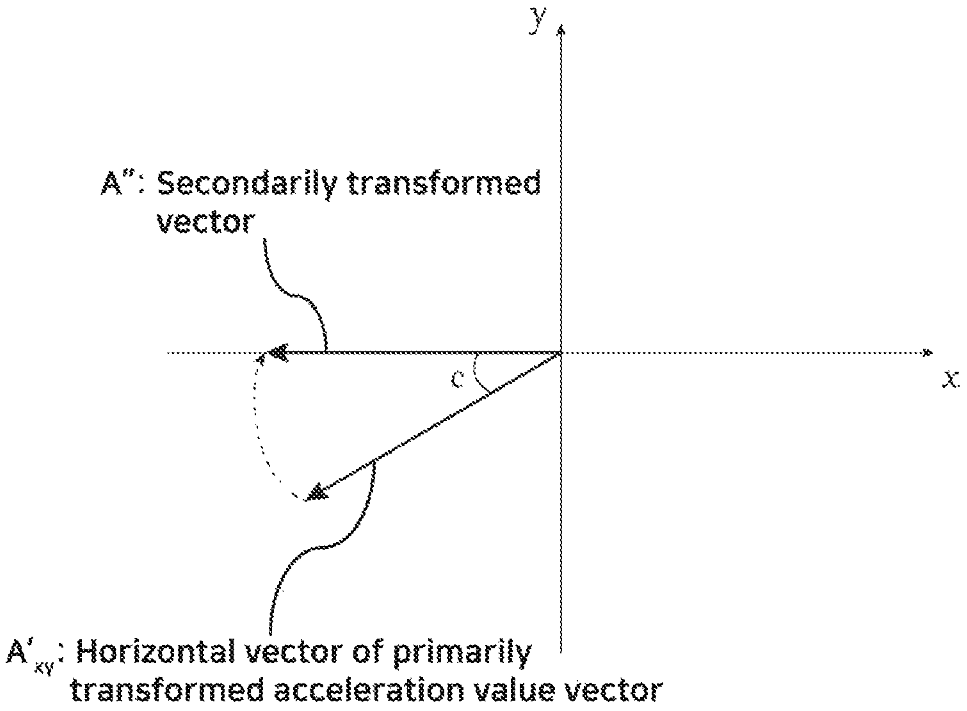
FIG. 5A illustrates an example of secondary transformation on a horizontal plane when a vehicle slows down according to an embodiment.

FIG. 5A illustrates an example of secondary transformation on a horizontal plane when a vehicle slows down according to an embodiment.

Referring to FIG. 5A, although inverse data is calculated in a case in which the vehicle slows down, contrary to the case in which the vehicle speeds up, the angle c may be obtained similarly. Further, the above-described conditions for performing the secondary transformation when the vehicle speeds up may be applied identically.

Figure 5B:
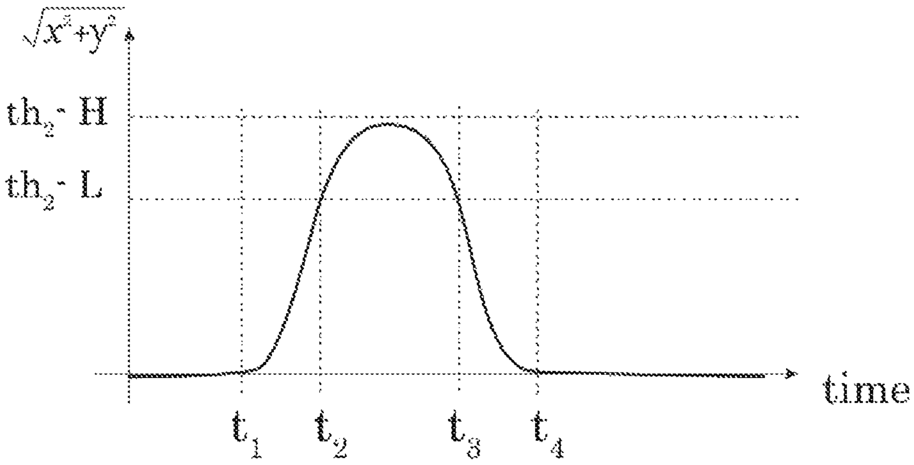
FIG. 5B is a graph illustrating a magnitude of an acceleration on a horizontal plane over time when a vehicle slows down according to an embodiment.

FIG. 5B is a graph illustrating a magnitude of an acceleration on a horizontal plane over time when a vehicle slows down according to an embodiment. Referring to FIG. 5B, when the vehicle slows down, the magnitude of x, y vector may be great and a gradient of a change in the magnitude may be great, unlike the case of FIG. 4B in which the vehicle speeds up. To analyze this pattern, the angle c may be obtained by predetermining a set value with respect to deceleration.

Figure 6:
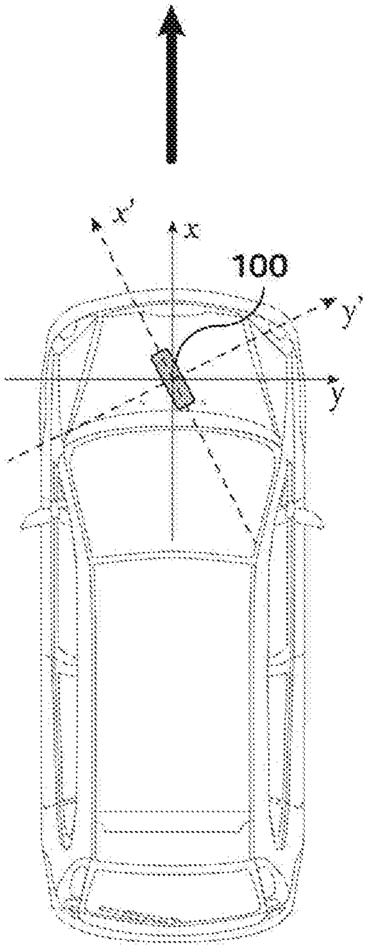
FIG. 6 is a top view illustrating an acceleration sensor with twisted axes according to an embodiment.

FIG. 6 is a top view illustrating an acceleration sensor with twisted axes according to an embodiment.

Describing the angle c further with reference to FIG. 6, the angle c may be an angle to match the value of the axis x of the acceleration sensor 131 to the travel direction of the vehicle. The angle c may not always change, and be calculated as a mean value like previous values of the angle c each time the acceleration value is measured. Here, the coordinate system (x', y', z') is a coordinate system before calibration, and the coordinate system (x, y, z) is a calibrated coordinate system.

The acceleration data calibrator 111 may calculate the angle c through the secondary transformation, and store the value of the angle c in the memory 120. Then, each time the data of the acceleration sensor 131 is read, an acceleration value vector calibrated using the pre-stored angles a, b and c may be stored in the memory 120.

According to another example, the acceleration sensor calibration apparatus 100 may recognize a crash of the vehicle and transmit vehicle information related to the crash to the server 200. When the magnitude of the horizontal plane vector of the primarily transformed vector exceeds the predetermined value, the processor 110 may recognize the crash of the vehicle. In response to the recognition of the crash of the vehicle, the processor 110 may transmit data related to a position, a velocity, and an acceleration of the vehicle to the server 200 through the communicator 140.

The data related to the position, the velocity, and the acceleration of the vehicle may be obtained based on values measured in real time by the acceleration sensor 131, the gyroscope 132 and the GPS receiver 133. The data related to the position, the velocity and the acceleration of the vehicle transmitted to the server 200 may be data of a total of 30 seconds, a sum of 15 seconds before the crash and 15 seconds after the crash. As described above, content of the data may include an instruction type, a device unique ID, a protocol version, a current time (year, month, day, hour, minute, second), a current position (latitude, longitude), a current velocity (speed, direction) of the vehicle, an acceleration sensor value, or a gyroscope value. An example of the data is shown in the following <Table 1>. When the data in a format as shown in <Table 1> is transmitted to the server 200, the server 200 may determine a direction of the crash and an intensity of the crash when the crash occurs. If consecutive data of a set period is transmitted to the server 200, the server 200 may analyze crash information every second even when a chain crash occurs.

TABLE 1

| Field | Definitions | Unit | Remark |
|---|---|---|---|
| HDR | "ST300CR" | | Command type |
| DEV_ID | 9 char | | Device ID |
| VER | 3 char | | Protocol Version |
| LEN | 2 bytes | | Length of data |
| DATA | 786 bytes | | |
| CHK_SUM | 1 byte | | 8 bit XOR Checksum |

<example>
ST300CRR;000000000;02;LEN;DATA;CHK_SUM
<note>
* DATA:
- Time : 6bytes
Year 1 byte : Integer TABLE 1-continued Month 1 byte : Integer
Day 1 byte : Integer
Hour 1 byte : Integer
Minute 1 byte : Integer
Second 1 byte : Integer
- Crash Reconstruction Data: 26 bytes * 30 sec = 780 bytes
Latitude: double float: 8 bytes
Longitude: double float: 8 bytes
Speed 4bytes: float: 4 bytes
Accelerometer X-Axis: integer: 2 bytes
Accelerometer Y-Axis: integer: 2 bytes
Accelerometer Z-Axis: integer: 2 bytes The period (30 seconds) of the data transmitted in response to the crash or the content of the data is provided as an example, and embodiments are not limited to the value and the content.

Hereinafter, an acceleration sensor calibration method using the acceleration sensor calibration apparatus 100 will be described.

Figure 7:
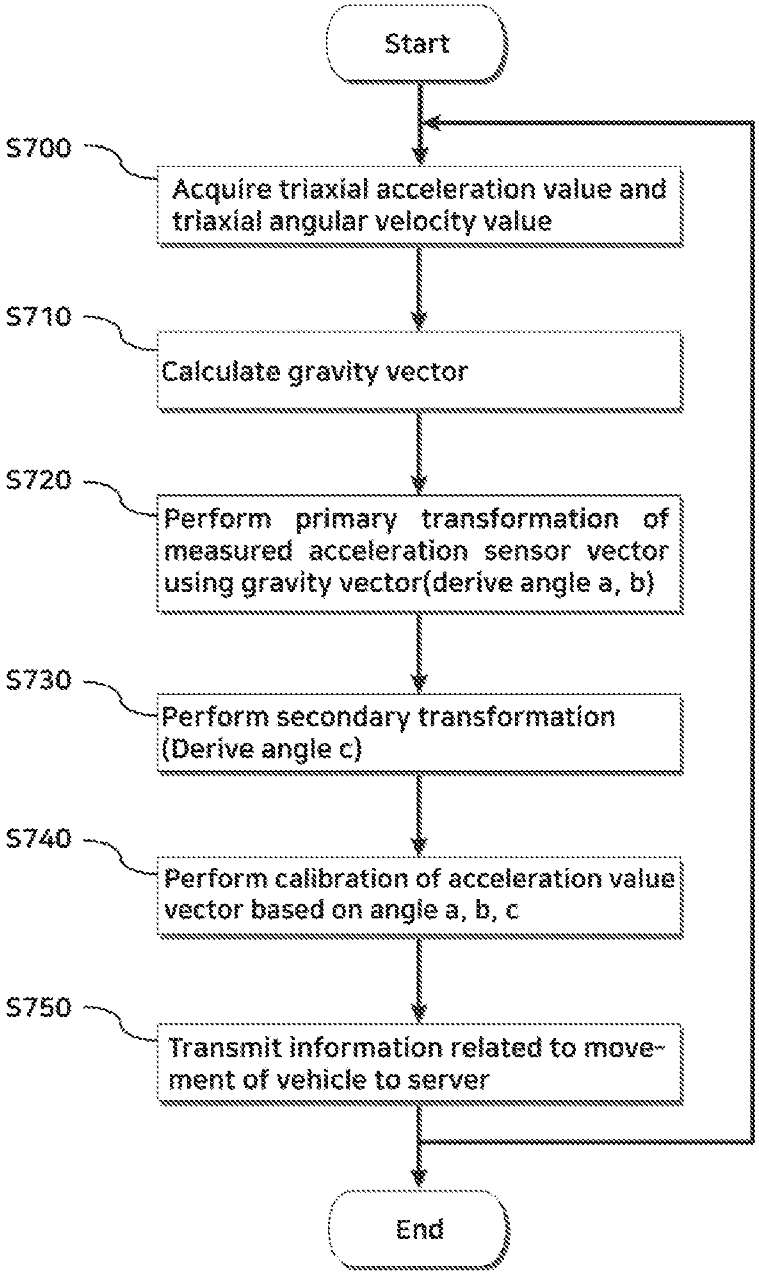
FIG. 7 is a flowchart illustrating an acceleration sensor calibration method according to an embodiment.

FIG. 7 is a flowchart illustrating an acceleration sensor calibration method according to an embodiment.

Referring to FIG. 7, in operation S700, an acceleration sensor calibration method using the real-time acceleration sensor calibration apparatus 100 for measuring a movement of a vehicle may measure a triaxial acceleration value and a triaxial angular velocity value using the acceleration sensor 131 and the gyroscope 132.

In operation S710, the acceleration data calibrator 111 may calculate a gravity vector based on the measured triaxial acceleration value and the measured triaxial angular velocity value. When the gravity vector is calculated, the acceleration data calibrator 111 may perform primary transformation with respect to a vector of the measured acceleration value using the calculated gravity vector, in operation S720. When the primary transformation is performed, angles a and b which are rotation angles about an axis x and an axis y may be derived.

In operation S730, the acceleration data calibrator 111 may perform secondary transformation to match a travel direction of the vehicle to the axis x of the acceleration sensor. An angle c may be derived through the secondary transformation. In operation S740, the acceleration data calibrator 111 may calibrate the vector of the acceleration value based on the angles a, b and c derived through the primary transformation and the secondary transformation with respect to the vector of the acceleration value.

In operation S750, the communicator 140 may transmit information related to a movement of the vehicle to the server 200 based on data related to the calibrated vector of the acceleration value. The information related to the movement of the vehicle may be information calculated based on values measured in real time by the acceleration sensor 131, the gyroscope 132 and the GPS receiver 133, and for example, may be provided in the data format as shown in Table 1.

Meanwhile, the acceleration value may need to be calibrated continuously or in real time based on geographical features as shown in FIGS. 2B and 2C. Thus, the acceleration sensor calibration apparatus 100 of FIG. 2 may calculate a and b each time the acceleration is measured and calibrate the measured acceleration value by iteratively performing operations S700 through S750 after operation S750 is performed to measure the acceleration in real time.

Figure 8:
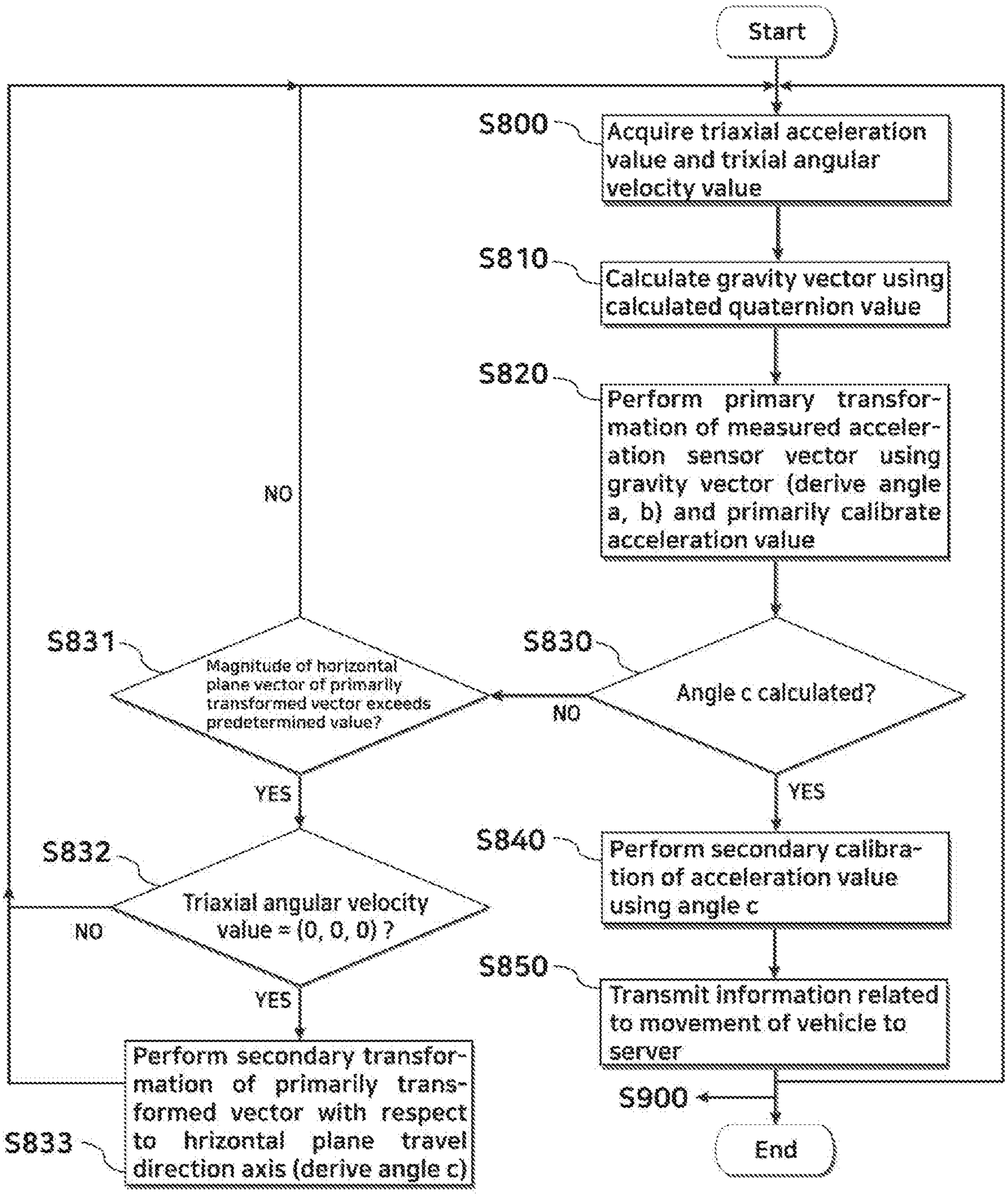
FIG. 8 is a flowchart illustrating an acceleration sensor calibration method according to another embodiment.

FIG. 8 is a flowchart illustrating an acceleration sensor calibration method according to another embodiment. Referring to FIG. 8, in operation S800, the acceleration data calibrator 111 may acquire a triaxial acceleration value and a triaxial angular velocity value through the data acquirer 130.

In operation S810, the acceleration data calibrator 111 may calculate a gravity vector using a quaternion value calculated based on the acquired triaxial acceleration value and the acquired triaxial angular velocity value. In operation S820, the acceleration data calibrator 111 may obtain angles a and b through primary transformation of an acceleration sensor vector using the gravity vector calculated using the quaternion value, primarily calibrate the acceleration sensor value vector using the derived angles a and b, and store the derived angles a an d b in the memory 120.

Here, in operation S830, the acceleration data calibrator 111 may verify whether an angle c is calculated in the memory 120. If the angle c is already calculated, the acceleration data calibrator 111 may perform secondary calibration through the angle c, in operation S840. If the angle c is yet to be calculated, the acceleration data calibrator 111 may calculate a value of the angle c based on a horizontal plane vector value of the primarily transformed vector, as described with reference to FIGS. 4A and 5A.

The value of the angle c may be calculated only when predetermined conditions are satisfied. For example, only when a magnitude of the horizontal plane vector of the primarily transformed vector exceeds a predetermined value in operation S831, and the triaxial angular velocity value is (0, 0, 0) in operation S832, the acceleration data calibrator 111 may perform the secondary transformation to derive the angle c, in operation S833.

After calculating the secondarily transformed angle c, the acceleration data calibrator 111 may store the angle c in the memory 120. Each time the data of the acceleration sensor 131 is read, the primary calibration and the secondary calibration may be performed using the angles a, b and c pre-stored in the memory 120, in operations S820 and S840. In operation S850, information related to a movement of a vehicle may be transmitted to the server 200 at preset intervals. The information related to the movement of the vehicle may be information calculated based on values measured in real time by the acceleration sensor 131, the gyroscope 132 and the GPS receiver 133, and include, for example, data related to a measured movement such as harsh acceleration, harsh deceleration or harsh turn, or crash data when a crash occurs. The information related to the movement of the vehicle may be provided in the data format as shown in Table 1.

According to another embodiment, an operation of transmitting crash information to a server in response to recognition of a crash of the vehicle may be included.

Figure 9:
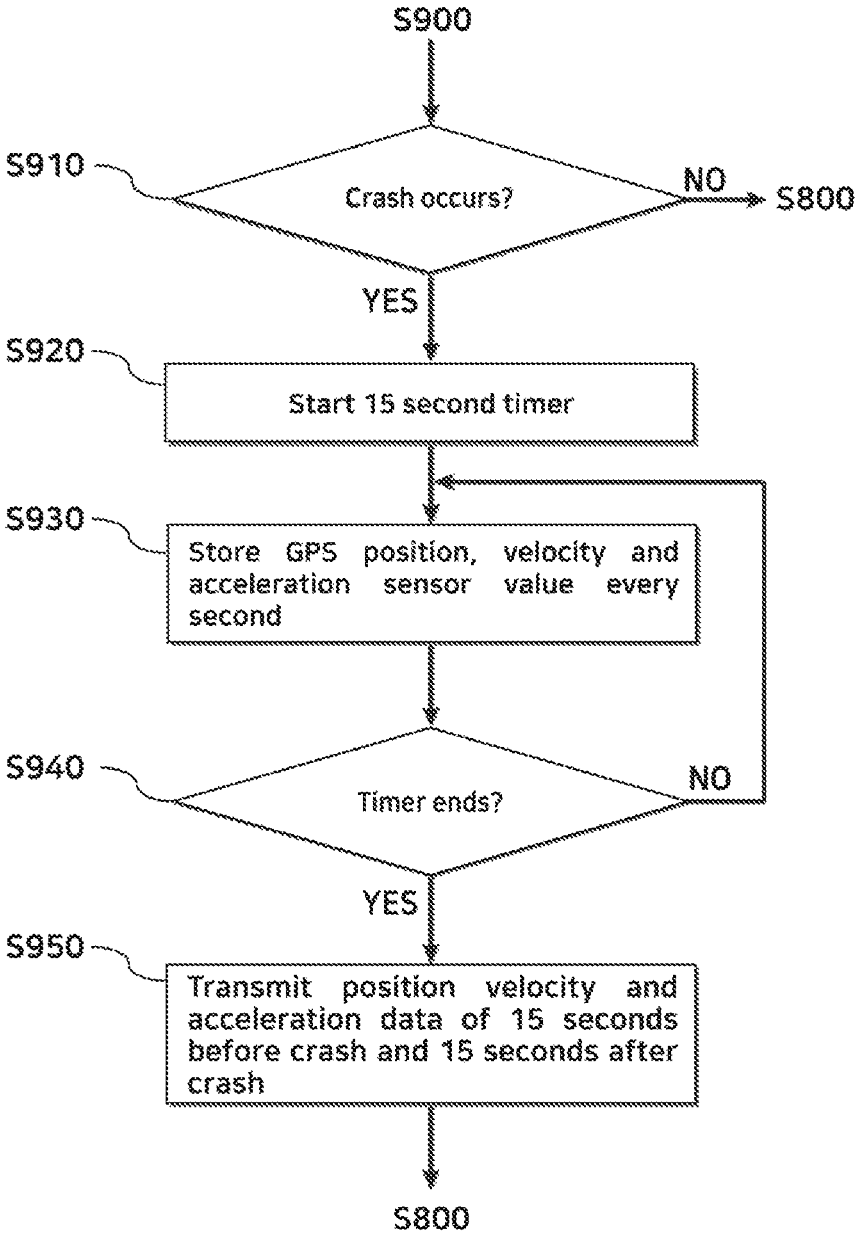
FIG. 9 is a flowchart illustrating an example of transmitting crash information to a server when a vehicle crash occurs.

FIG. 9 is a flowchart illustrating an example of recognizing occurrence of a crash and transmitting crash information to a server in a case in which crash data is included in operation S850 of FIG. 8. Referring to FIG. 9, when the acceleration sensor calibration apparatus 100 recognizes a crash of a vehicle in operation S910, the processor 110 may operate a timer for 15 seconds, in operation S920. The processor 110 may store a GPS position, a velocity, and an acceleration sensor value in the memory 120 every second until the timer ends, in operation S930.

When the timer ends in operation S940, the communicator 140 may transmit, to the server 200, position, velocity and acceleration data of a predetermined period, for example, 15 seconds before the crash and 15 seconds after the crash, in operation S950. In this example, examples of the transmitted data are described in detail above, and thus duplicate description will be omitted here. When the data transmission is completed, the acceleration sensor calibration apparatus 100 may return to operation S800 and execute the series of operations again.

Figure 10:
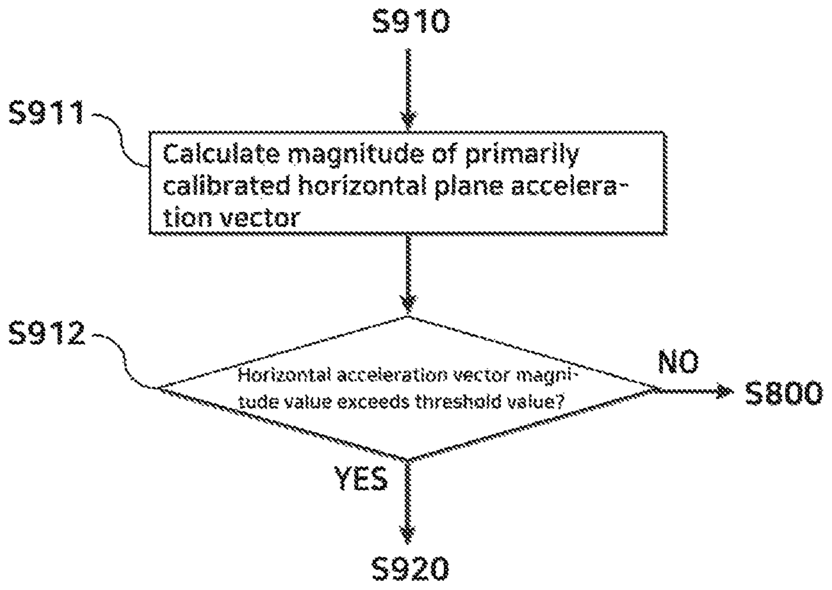
FIG. 10 is a flowchart illustrating an example of recognizing a vehicle crash according to an embodiment.

FIG. 10 is a flowchart illustrating an example of recognizing a vehicle crash according to an embodiment.

Referring to FIG. 10, when an external force is applied due to a vehicle crash, an acceleration sensor value may change greatly. In this example, a threshold value for interrupt occurrence caused by the change in the acceleration sensor value may be set. An interrupt may be generated by recognizing the vehicle crash only when exceeding the threshold value.

In detail, in operation S911, a magnitude of a horizontal plane vector of the primarily transformed vector of the measured acceleration vector may be calculated. The horizontal plane vector of the primarily transformed vector may have a z-axial value of the direction of gravity corresponding to "0", and thus a magnitude on a horizontal plane, that is, an xy-axial plane, may be calculated.

In a case in which the calculated magnitude of the horizontal plane vector of the primarily transformed vector exceeds the predetermined threshold value, the acceleration sensor calibration apparatus 100 may recognize the vehicle crash and move to operation S920. Conversely, in a case in which the magnitude of the horizontal plane vector of the primarily transformed vector does not exceed the threshold value, the acceleration sensor calibration apparatus 100 may not recognize the vehicle crash and move to S800.

The real-time acceleration sensor calibration apparatus for measuring a movement of a vehicle and the acceleration sensor calibration method using the same according to embodiments are described in detail above. However, the embodiments are not limited thereto, and should be construed broadly within its spirit and scope disclosed herein. It will be apparent to those skilled in the art that the embodiments can be combined and/or replaced to achieve alternative embodiments not explicitly described herein, without departing from the spirit or scope of the present disclosure. In addition, various alterations and modifications may be made to the embodiments disclosed herein, and should be construed as being covered within the scope of the following claims.

What is claimed is:

1. A real-time acceleration sensor calibration apparatus for measuring a movement of a vehicle, the real-time acceleration sensor calibration apparatus comprising:

an acceleration sensor configured to measure a triaxial acceleration value;

a gyroscope configured to measure a triaxial angular velocity value;

an acceleration data calibrator configured to primarily transform a vector of the measured triaxial acceleration value using a gravity vector calculated based on the triaxial acceleration value measured by the acceleration sensor and the triaxial angular velocity value measured by the gyroscope; and a communicator configured to transmit information related to the movement of the vehicle to a server calculated based on transformed vector of the triaxial acceleration value, wherein the acceleration data calibrator is configured to perform a secondary transformation with respect to a horizontal plane travel direction axis when a magnitude of a horizontal plane vector of the primarily transformed vector exceeds a predetermined value.

2. The real-time acceleration sensor calibration apparatus of claim 1, wherein the gravity vector is calculated using a quaternion value calculated based on the triaxial acceleration value and the triaxial angular velocity value.

3. The real-time acceleration sensor calibration apparatus of claim 1, wherein the secondary transformation is performed when the triaxial angular velocity value is (0, 0, 0).

4. The real-time acceleration sensor calibration apparatus of claim 1, wherein the acceleration data calibrator is configured to determine angles a and b for the primary transformation and an angle c for the secondary transformation, and transform the vector of the triaxial acceleration value measured by the acceleration sensor using the angles a, b and c.

5. The real-time acceleration sensor calibration apparatus of claim 4, wherein the angles a and b are derived in real time by the acceleration data calibrator each time the vector of the triaxial acceleration value is measured by the acceleration sensor.

6. The real-time acceleration sensor calibration apparatus of claim 4, wherein the acceleration data calibrator is configured to calculate the angle c based on a value of the horizontal plane vector of the primarily transformed vector, if a value of the angle c is yet to be calculated.

7. The real-time acceleration sensor calibration apparatus of claim 1, further comprising:

a global positioning system (GPS) receiver configured to detect a position of the vehicle, wherein the real-time acceleration sensor calibration apparatus is configured to recognize a crash of the vehicle when a magnitude of a horizontal plane vector of the primarily transformed vector exceeds a predetermined value, and transmit data related to the position, a velocity and an acceleration of the vehicle through the communicator to the server in response to the recognition of the crash of the vehicle.

8. An acceleration sensor calibration method using a real-time acceleration sensor calibration apparatus for measuring a movement of a vehicle, the acceleration sensor calibration method comprising:

measuring a triaxial acceleration value using an acceleration sensor;

measuring a triaxial angular velocity value using a gyroscope;

calculating a gravity vector based on the measured triaxial acceleration value and the measured triaxial angular velocity value;

primarily transforming a vector of the measured triaxial acceleration value using the calculated gravity vector;

performing a secondary transformation with respect to a horizontal plane travel direction axis when a magnitude of a horizontal plane vector of the primarily transformed vector exceeds a predetermined value; and transmitting, to a server, information related to the movement of the vehicle calculated based on transformed vector of the measured triaxial acceleration value.

9. The acceleration sensor calibration method of claim 8, wherein the gravity vector is calculated using a quaternion value calculated based on the triaxial acceleration value and the triaxial angular velocity value.

10. The acceleration sensor calibration method of claim 8, wherein the secondary transformation is performed when the triaxial angular velocity value is (0, 0, 0).

11. The acceleration sensor calibration method of claim 8, wherein angles a and b for the primary transformation and an angle c for the secondary transformation are determined, and the vector of the triaxial acceleration value measured by the acceleration sensor is transformed using the angles a, b and c.

12. The acceleration sensor calibration method of claim 11, wherein the angles a and b are derived in real time by an acceleration data calibrator each time the vector of the triaxial acceleration value is measured by the acceleration sensor.

13. The acceleration sensor calibration method of claim 11, wherein the angle c is calculated based on a value of the horizontal plane vector of the primarily transformed vector, if a value of the angle c is yet to be calculated.

14. The acceleration sensor calibration method of claim 8, further comprising:

recognizing a crash of the vehicle when a magnitude of a horizontal plane vector of the primarily transformed vector exceeds a predetermined value; and transmitting, to the server, data related to the position, a velocity and an acceleration of the vehicle measured by a global positioning system (GPS) receiver in response to the recognition of the crash of the vehicle.

* * * * *